(12) United States Patent
Smoot

(10) Patent No.: US 6,945,587 B2
(45) Date of Patent: Sep. 20, 2005

(54) METHOD, SYSTEM AND DEVICE FOR BLOCKING SUNLIGHT

(76) Inventor: Sue Smoot, 1900 Tierra Vida Place NW., Albuquerque, NM (US) 87107

( * ) Notice: Subject to any disclaimer, the term of this patent is extended or adjusted under 35 U.S.C. 154(b) by 84 days.

(21) Appl. No.: 10/644,984

(22) Filed: Aug. 20, 2003

(65) Prior Publication Data

US 2004/0165275 A1 Aug. 26, 2004

Related U.S. Application Data

(60) Provisional application No. 60/428,988, filed on Nov. 25, 2002.

(51) Int. Cl.[7] .................................................. B60J 3/00
(52) U.S. Cl. ..................... 296/97.9; 296/97.1; 296/97.6
(58) Field of Search ................................ 296/97.1, 97.5, 296/97.6, 97.7, 97.9, 97.13; 160/DIG. 2, DIG. 3, 370.21, 37.22, 370.22; 224/312, 901.2, 907.8

(56) References Cited

U.S. PATENT DOCUMENTS

| | | | | |
|---|---|---|---|---|
| 2,163,495 A | * | 6/1939 | Levy | 296/97.5 |
| 2,252,716 A | * | 8/1941 | Levy | 296/97.5 |
| 2,549,395 A | * | 4/1951 | Short, Sr. | 296/97.9 |
| 2,620,222 A | * | 12/1952 | Beauchamp | 296/97.9 |
| 4,172,613 A | * | 10/1979 | Furando | 296/97.7 |
| 4,958,879 A | * | 9/1990 | Gillum | 296/97.9 |
| 4,974,896 A | * | 12/1990 | Konishi | 296/97.7 |
| 5,575,523 A | * | 11/1996 | Keller | 296/97.9 |
| 5,979,967 A | * | 11/1999 | Poulson | 296/97.9 |
| 6,296,294 B1 | * | 10/2001 | Kohnle et al. | 296/97.9 |
| 6,513,855 B2 | * | 2/2003 | Zenisek | 296/97.9 |
| 2002/0135197 A1 | * | 9/2002 | Howard | 296/97.7 |

* cited by examiner

*Primary Examiner*—Lori L. Coletta
(74) *Attorney, Agent, or Firm*—Kevin Lynn Wildenstein

(57) ABSTRACT

A light blocking system, apparatus and device which substantially reduces or eliminates light transmission from occurring in that area surrounding a vehicle's rear view mirror between the vehicle's visors. In one embodiment, the present invention is of sufficient width and height to substantially cover the sunlight transmission area while allowing operation of the vehicle, the apparatus including a notch adapted to receive an arm which connects the rear view mirror to the main viewing window; and a coupling system on the apparatus, the coupling system adapted to removably secure the apparatus into and from the sunlight transmission area.

20 Claims, 6 Drawing Sheets

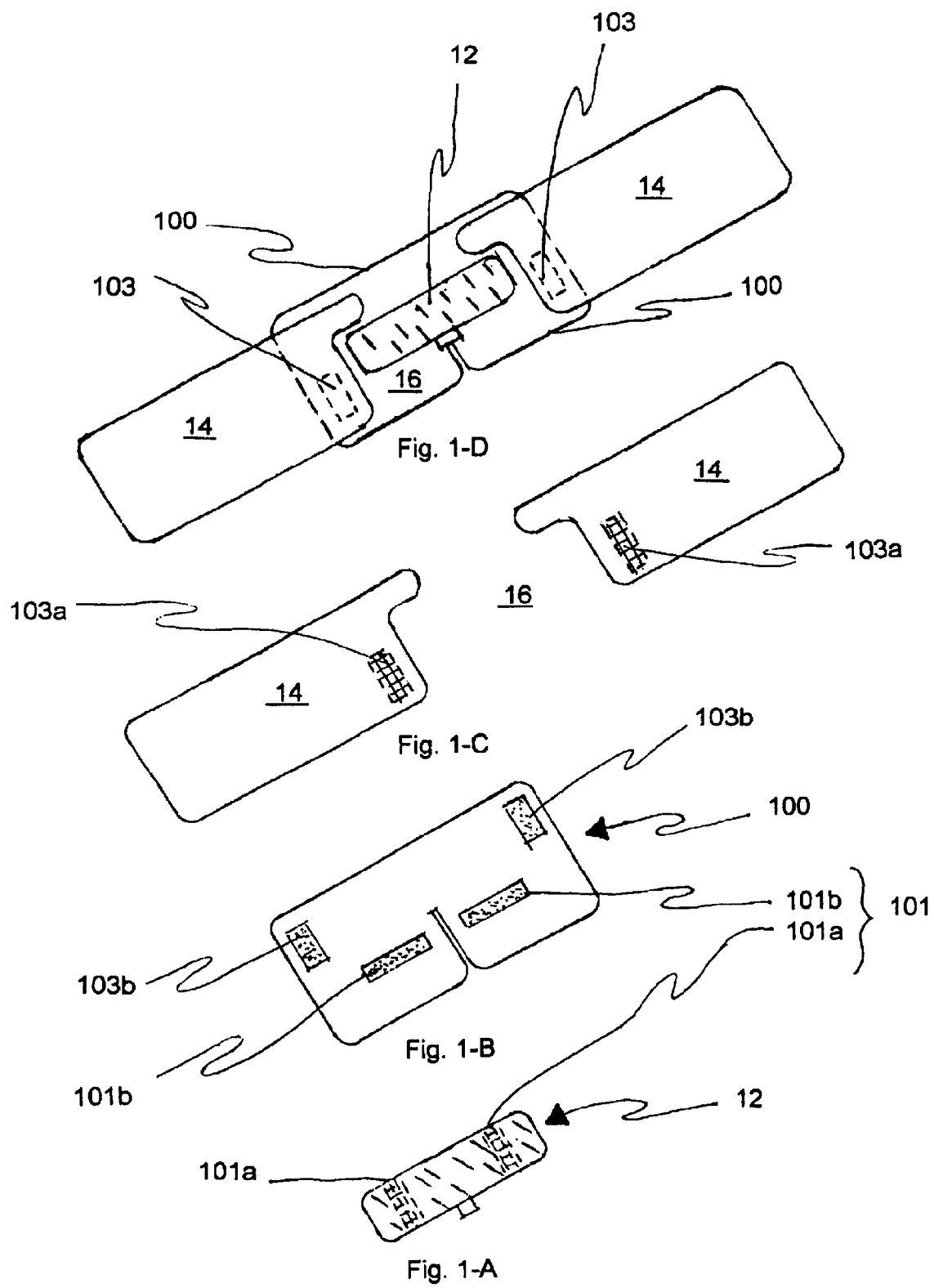

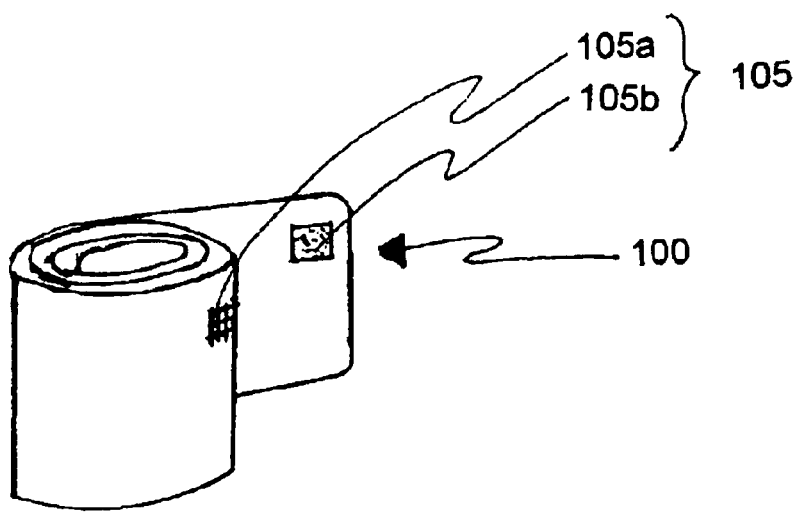
Fig. 1-E
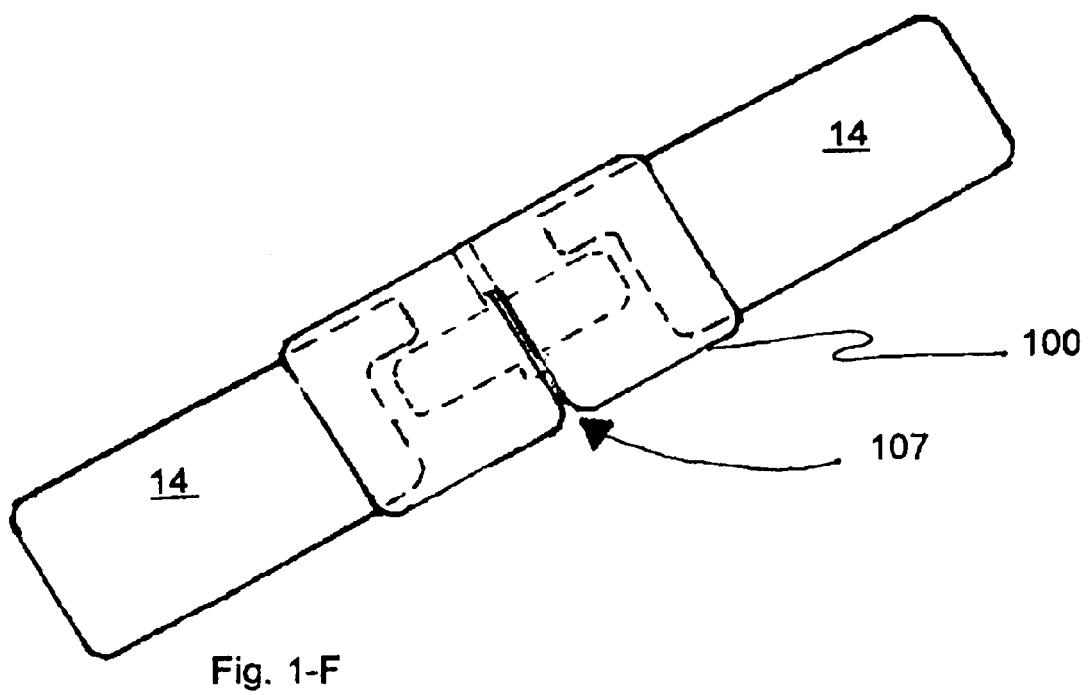
Fig. 1-F

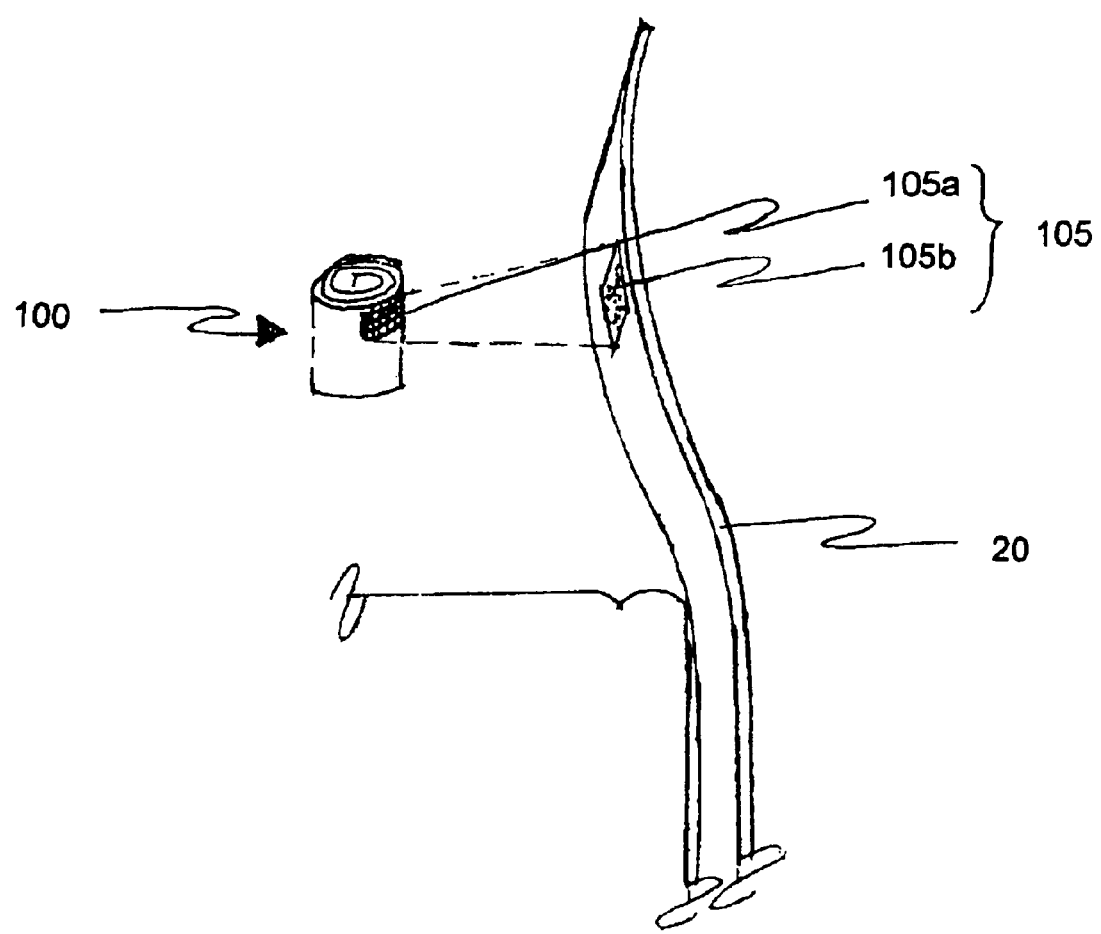
Fig. 1-G

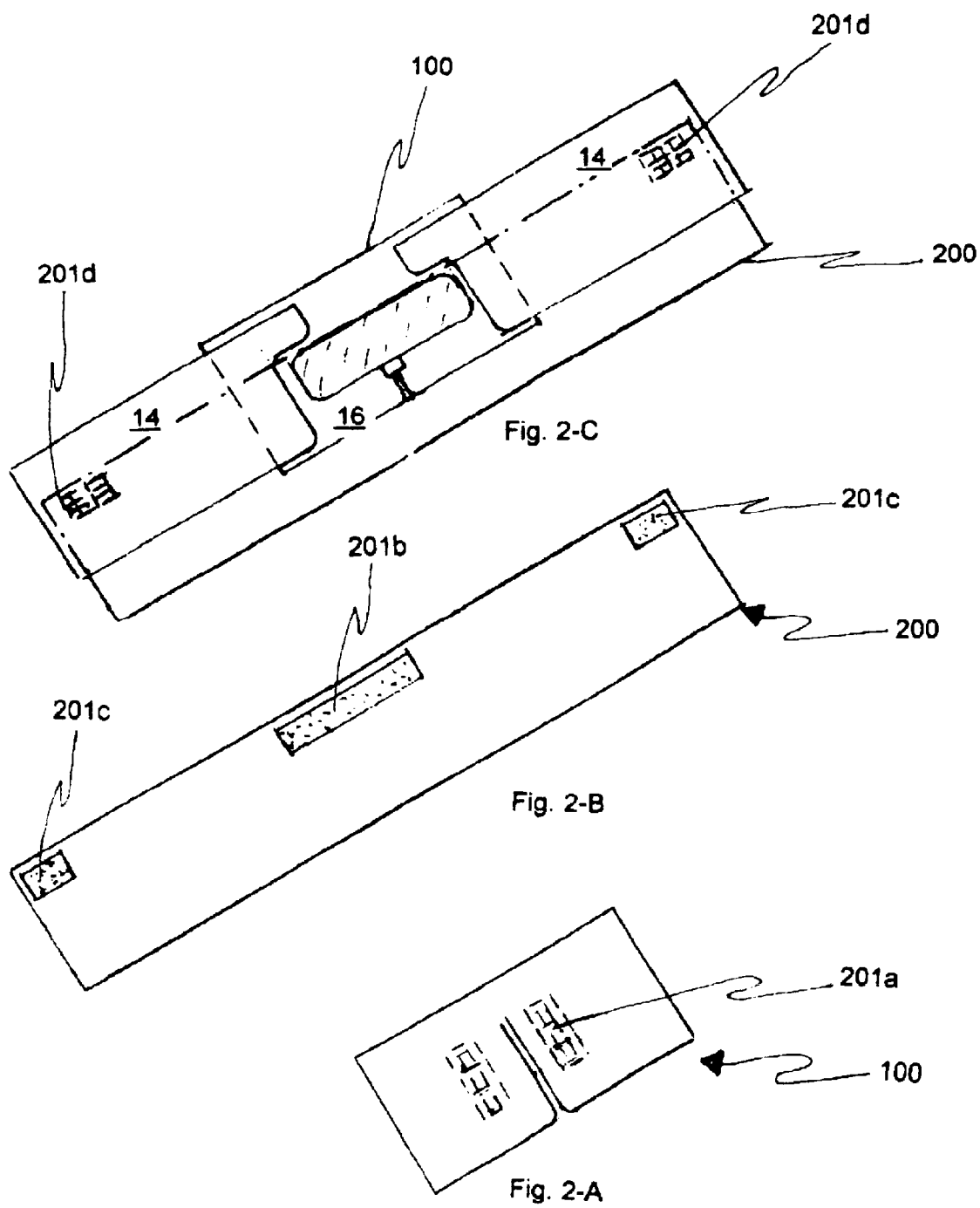

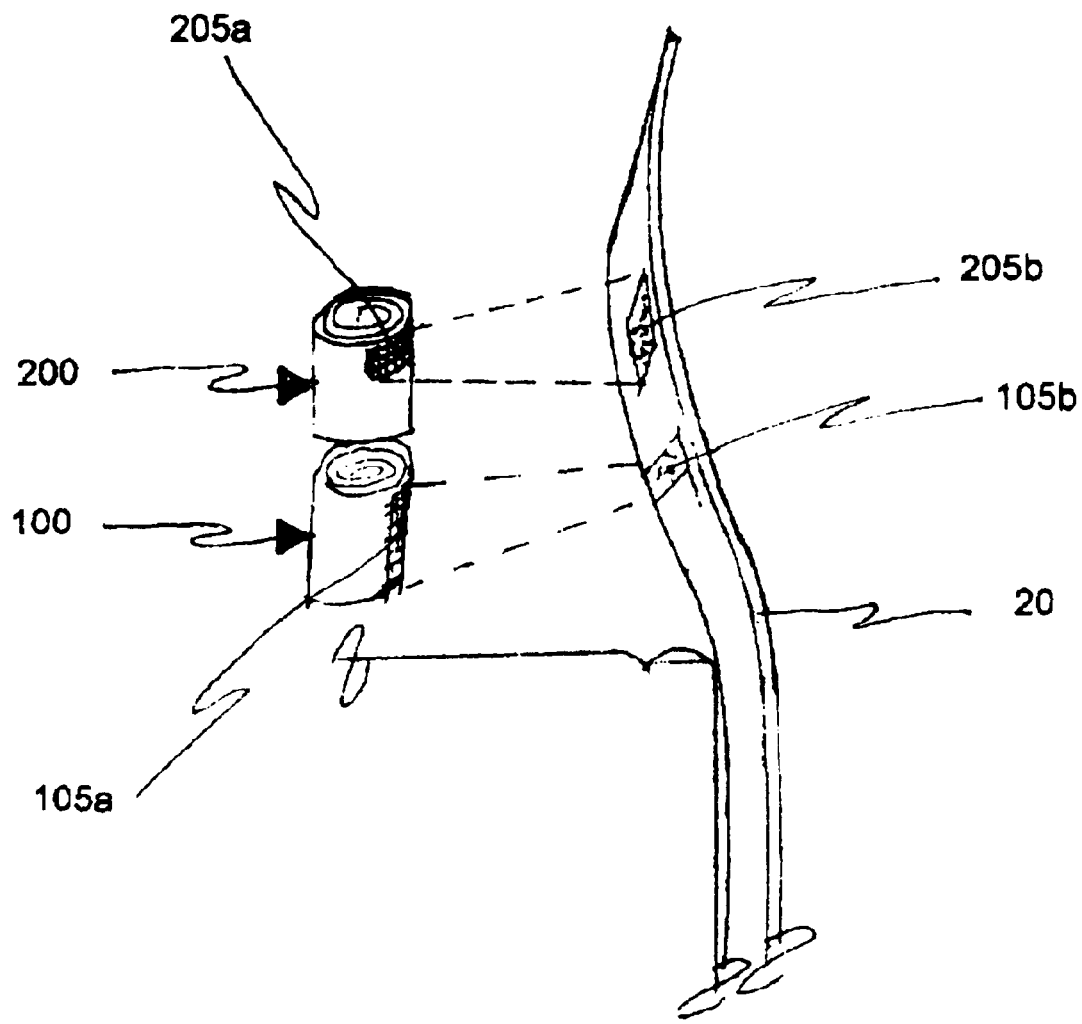
Fig. 2-D

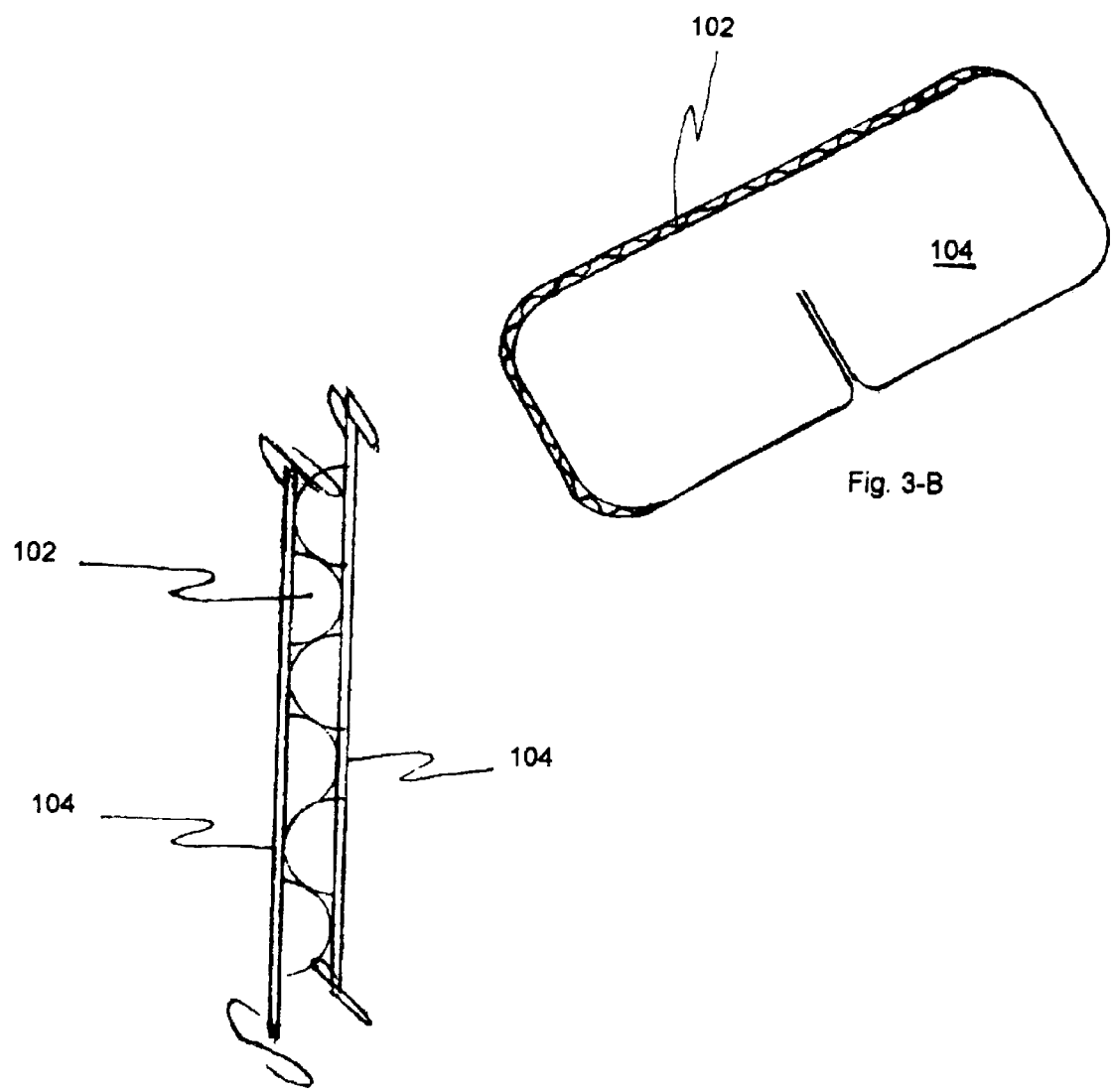

US 6,945,587 B2

METHOD, SYSTEM AND DEVICE FOR BLOCKING SUNLIGHT

CLAIM OF PRIORITY

The present invention claims priority based upon U.S. Provisional Patent Application Ser. No. 60/428,988, filed Nov. 25, 2002, which is hereby incorporated by reference.

FIELD OF INVENTION

The present invention relates generally to devices which substantially reduce or eliminate sunlight, and more particularly, to a method, apparatus and device for reducing or eliminating sunlight directed towards the operator of a vehicle.

BACKGROUND OF THE INVENTION

Almost all vehicles are manufactured to include at least one pair of sun visors which are mounted near the main viewing window such as a front windshield. One visor is usually placed in front of the vehicle operator (e.g., above the driver's seat) and the other visor is usually placed in front of the vehicle's passenger (e.g., above the passenger seat). The function of each visor is to prevent the transmission of sunlight to, primarily, the driver, and secondarily, to the passenger in order to allow the vehicle to be operated safely.

Standard sun visors leave a gap or opening in the area surrounding the rear view mirror. This unshielded space, or sunlight transmission area, allows harsh sunlight to be transmitted to the driver thereby potentially obstructing the driver's vision, and hence, the driver's ability to operate the vehicle safely. This effect is more noticeable in the morning hours and the late afternoon hours, when the sun is either coming up or going down, thereby having an almost linear light transmission path towards the driver's eyes.

To partially solve this problem, manufacturers have manufactured newer model cars with sun visors which have a slidable shield which can be pulled out from the visor to partially cover the unshielded space. While this option provides a solution, it is found only in newer model vehicles and does not completely cover the sunlight transmission area. These types of visors can likely be retrofit into older model vehicles, however, they will be costly both to manufacture and to install.

In view of the foregoing, there is a need for a low-cost, single piece system, apparatus or device which can substantially reduce or otherwise eliminate the transmission of sunlight in the area surrounding a vehicle's rear view mirror and between the driver's side visor and the passenger's side visor. The present invention satisfies this need.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

The present invention is a method, apparatus or device which can substantially reduce or otherwise eliminate the transmission of sunlight in the area surrounding a vehicle's rear view mirror and between the driver's side visor and the passenger's side visor. It is an intent that the present invention be manufactured at low cost, be adapted for ease of installation when used in a vehicle and be flexible to allow for easy storage when not in use.

In one embodiment, the present invention is a sun shield or light blocking system of sufficient width, height and shape to substantially cover the sunlight transmission area while allowing operation of the vehicle, the apparatus including a notch adapted to receive an arm which connects the rear view mirror to the main viewing window; and a coupling system on the apparatus, the coupling system adapted to removably secure the apparatus into and from the sunlight transmission area.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

FIGS. 1-A through 1-C illustrate, through an exploded view, how the present invention integrates with a vehicle's sun visors and rear view mirror as configured for one embodiment according to the present invention;

FIG. 1-D illustrates how one embodiment of the present invention integrates within the sunlight transmission area within a vehicle;

FIG. 1-E illustrates an exemplary embodiment of the present invention in a stored, or rolled up, position;

FIG. 1-F illustrates one embodiment of the present invention as it may be viewed by the vehicle operator, the dashed lines illustrating portions of a vehicle's left side and right side sun visors, and the vehicle's rear view mirror with an arm attachment which attaches the mirror to the vehicle;

FIG. 1-G illustrates the present invention in a folded position, highlighting how the invention can be attached to a surface (such as a console) within a vehicle when the invention is not in use;

FIGS. 2-A through 2-C illustrate an exemplary accessory shield which can be used with the present invention to provide additional sun blocking capability;

FIG. 2-D illustrates another embodiment of the present invention with both the light blocking system and the accessory shield in a folded or stored position; and FIGS. 3-A through 3-B illustrate an exemplary material which may be used according to the present invention, FIG. 3-A illustrating a side plan view of the material, and FIG. B illustrating a to side perspective view according to one embodiment of the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

Referring now to FIGS. 1-A through 1-D, the present invention is directed towards, in one embodiment, a light blocking system and apparatus 100 which substantially reduces or eliminates light transmission from occurring in that area surrounding a vehicle's rear view mirror 12 between the vehicle's visors 14. In particular, a sunlight transmission area (generally denoted in the Figures as area 16) is defined by the area between a vehicle's two sun visors, which are sufficiently spaced apart from each other and from the vehicle's rear view mirror.

Light blocking apparatus 10 is of sufficient width, height and shape to substantially cover the sunlight transmission area while allowing safe operation of the vehicle. Preferably, light blocking apparatus 10 is formed from a generally flat but flexible material which is sufficient to reduce or eliminate any sunlight from being transmitted through the material to the vehicle operator. In one embodiment of the present invention as seen in FIG. 1-E and FIG. 1-G, light blocking apparatus 100 is formable to be folded or rolled by a vehicle operator so that the apparatus 100 can be stored for use as needed. In another embodiment of the present invention, as illustrated in FIG. 3-A and FIG. 3-B, the material comprising apparatus 100 is formed from bubble wrap 102 coupled to at least one or more exterior reflective shield 104.

One of the advantages of the present invention is that it is compact, light weight and a single piece material which is easily removably from (and insertable into) the sunlight transmission area 16 when needed. In this regard, the present invention further utilizes a rear view mirror coupling system 101 which removably secures the present invention to a rear surface of the rear view mirror 12. In one embodiment, the rear view mirror coupling system 101 comprises at least a first hook coupler 101a and a first pile coupler 101b which are adapted to be securely engaged to a rear surface of the rear view mirror 12 and the material 100. The first hook coupler 101a and the first pile coupler 101b maybe formed from conventional VELCRO brand or hook and loop tape fastening systems. Preferably, the first pile coupler is attached to the apparatus 100. In another embodiment, the first hook coupler 101a is placed on the rear view mirror 12 in a vertical orientation relative to any horizontal surface while the first pile coupler 101b is placed on the material 100 in a horizontal orientation relative to the same surface.

Optionally, the present invention also contemplates a visor coupling system which removably secures the present invention to a rear surface of each vehicle visor 14. In one embodiment, the visor coupling system 103 comprises at least a second hook coupler 103a and a second pile coupler 103b which are adapted to be securely engaged to a surface of each visor 14 and the material. The first hook coupler 101a and the first pile coupler 101b may be formed from conventional VELCRO brand or hook and loop tape fastening systems. Preferably, the first pile coupler 103b is attached to the apparatus 100. In another embodiment, the second hook coupler 103a is placed on the rear view mirror 12 in a vertical orientation relative to any horizontal surface while the second pile coupler 103b is placed on the material 100 in a horizontal orientation relative to the same surface.

It is well known in the art that vehicles comes in various sizes. It is also well known in the art that operators likewise come in various sizes. To accommodate both various-sized vehicles and operators, the present invention contemplates being adjustable in any spatial orientation so as to accommodate the varying sizes. To this end, the present invention contemplates that the first hook coupler 101a is preferably placed on the rear view mirror 12 in a different orientation than the first pile coupler's 101b orientation on the material 100. Similarly, the present invention contemplates that the second hook coupler 103a is preferably placed on the visor 14 in a different orientation that the second pile coupler's 103b orientation on the material 100. It is also contemplated that the present invention be formed in a rectilinear shape which allows it to be fitted into the light transmission area of any vehicle. In one embodiment, the dimension is approximately sixteen inches long by six inches high. Of course, for safety purposes, in any orientation, the present invention should not be inserted into the light transmission area, nor removed from the light transmission area, when the vehicle is being operated.

Some vehicles include rear view mirrors having an arm which attaches to the roof headliner, and some vehicles include rear view mirrors having an arm which attaches directly to the main viewing window or windshield. To accommodate placement of the present invention in both types of vehicles, a notch 107 may be inserted into the material 100 which is adapted to receive the arm.

Preferably, the material, when folded or rolled up for storage, will be less than two inches in diameter and can be placed so as not to interfere with the operation of the vehicle. In order to maintain a rolled up, or stored position, the present invention includes a storage coupling system 105 upon the material 100. The storage coupling system 105 comprises preferably one storage hook coupler 105a attached to the material 100 and at least one storage pile coupler 105b attached to the same material 100, the storage hook coupler 105a adapted to engage the storage pile coupler 105b when the material 100 is folded for storage.

Additionally, as illustrated in FIG. 1-G, a strip of pile tape or pile coupler can be attached to the vehicle's console 20 near the driver which would allow for convenient storage of the present invention. The pile strip is preferred in this situation, as the pile is soft and will not catch or tear other fabrics which come into contact with the pile strip.

An optional accessory shield 200 may also be introduced which provides additional sun blocking capabilities and is adapted to engage the light blocking apparatus 100 and at least one visor 14 through an accessory shield coupling system. As seen in FIG. 2-A, the front view of the light blocking system 100 is shown having two hook couplers 101a on a rear surface of the system 100 (dashed lines indicating exemplary placement on the rear surface) which are adapted to engage with the center pile coupler 201b on the optional accessory shield 200 (as seen in FIG. 2-B). When both the light blocking system 100 and the accessory shield 200 are placed within the light transmission area 16 (as seen in FIG. 2-C), the accessory shield's pile couplers 201c are adapted to engage hook couplers 201d on each visor. Again, the hook and pile couplers variously mentioned may be formed from conventional VELCRO brand or hook and loop tape fastening systems. And, again, the use of opposing vertical and horizontal strips eliminates the need for exact positioning of the present invention, and instead, allows the present invention to be moved to accommodate the driving conditions, the vehicle and the vehicle operator. Notably, with use of the optional accessory shield, two or three inches (or more) of sun protection can be added to the bottom of each visor to provide more protection to the operator, particularly when the sun is coming up, or going down, or when the operator is of small stature.

Finally, the present invention contemplates that more than one strip of pile tape or pile coupler can be attached to the vehicle's console 20 near the driver which would allow for convenient storage of the light blocking system and/or the accessory shield. Thus, as illustrated in FIG. 2-D, a strip of pile strip 205b or pile hook 205a can be attached to the vehicle's console 20 near the driver which would allow for convenient storage of the present invention. The pile strip 205b is preferred in this situation, as the pile is soft and carpet-like, and will not catch or tear other fabrics which come into contact with the pile strip during normal operation or use of the vehicle.

The present invention may be embodied as a method, an apparatus or a device. Other variations and modifications of the present invention will be apparent to those of ordinary skill in the art, and is not limited except by the appended claims. The particular values and configurations discussed above can be varied, and are cited to illustrate particular embodiments of the present invention. It is contemplated that the use of the present invention can involve components having different characteristics as long as the principles disclosed herein are followed.

What is claimed is:

1. A method for substantially reducing glare from sunlight when operating a vehicle having at least one pair of visors adjacent to a main viewing window, the visors spaced sufficiently apart from each other and from the vehicle's rear view mirror thereby defining a sunlight transmission area, the method comprising the steps of: introducing a light blocking apparatus, the apparatus being of sufficient width, height and shape to completely cover the sunlight transmission area while allowing operation of the vehicle; and allowing the apparatus to be removably securable to the rear view mirror in the sunlight transmission area from above the rear view mirror by a coupling system, the coupling system comprising at least a first hook coupler and at least a second pile coupler, the first hook coupler placed on the rear view mirror in a substantially vertical orientation relative to any horizontal surface, the first pile coupler placed on the apparatus in a substantially horizontal orientation relative to the surface.

2. The method according to claim 1, the apparatus being formed of material sufficient to reduce the transmission of any sunlight from transmitting therethrough.

3. The method according to claim 2, the material being formable to allow the apparatus to be folded by a vehicle operator for storage, and unfolded for use by the vehicle operator.

4. The method according to claim 2, the material being made of bubble wrap coupled to at least one exterior reflective shield.

5. The method according to claim 3, the coupling system comprising at least a rear view mirror coupling system and a visor coupling system.

6. The method according to claim 5, the rear view mirror coupling system being adjustable and comprising at least a first hook coupler and a first pile coupler, the first hook coupler and the first pile coupler being adapted to be securely engaged to the rear view mirror and the material.

7. The method according to claim 5, the visor coupling system comprising at least a second hook coupler and a second pile coupler, the second hook coupler and the second pile coupler being adapted to be securely engaged to the visor and the material.

8. The method according to claim 7, the first hook coupler being placed on the rear view mirror in a different orientation than the first pile coupler's orientation on the material, the second hook coupler being placed on each visor in a different orientation than the second pile coupler's orientation on the material.

9. The method according to claim 3, the method further comprising the step of introducing a console pile coupler on the apparatus, the console pile coupler being attachable to an interior vehicle surface near the operator.

10. The method according to claim 3 further comprising the step of introducing an accessory shield adapted to engage the light blocking apparatus and at least one visor through an accessory shield coupling system.

11. The method according to claim 3 further comprising the step of placing a storage fastening system on the material, the storage fastening system comprising at least one storage hook coupler attached to the material and at least one storage pile coupler attached to the material, the storage hook coupler adapted to engage the storage pile coupler when the material is folded for storage.

12. The product made in accordance with the method of claim 11.

13. An article of manufacture for substantially reducing glare from sunlight when operating a vehicle having at least one pair of visors adjacent to a main viewing window, the visors spaced sufficiently apart from each other and from the vehicle's rear view mirror thereby defining a sunlight transmission area, the apparatus comprising: a light blocking apparatus, the apparatus being of sufficient width and height to completely cover the sunlight transmission area while allowing operation of the vehicle, the apparatus including a notch adapted to receive an arm from an adjacent position next to a headliner within the vehicle which connects the rear view mirror to the main viewing window, and a coupling system on the apparatus, the coupling system adapted to removably secure the apparatus into and from the sunlight transmission area, the coupling system comprising at least a first hook coupler and at least a second pile coupler, the first hook coupler placed on the rear view mirror in a substantially vertical orientation relative to any horizontal surface, the first pile coupler placed on the apparatus in a substantially horizontal orientation relative to the surface.

14. The article according to claim 13, the article being formed of material sufficient to reduce or eliminate any sunlight from transmitting therethrough, and which is formable to allow the article to be folded by a vehicle operator for storage, and unfolded for use by the vehicle operator.

15. The article according to claim 14, the coupling system comprising at least a rear view mirror coupling system and a visor coupling system.

16. The article according to claim 15, the rear view mirror coupling system being adjustable and comprising at least a first hook coupler and a first pile coupler, the first hook coupler and the first pile coupler being adapted to be securely engaged to the rear view mirror and the material; and the visor coupling system comprising at least a second hook coupler and a second pile coupler, the second hook coupler and the second pile coupler being adapted to be securely engaged to the visor and the material.

17. The article according to claim 16, the first hook coupler being placed on the rear view mirror in a different orientation than the first pile coupler's orientation on the material.

18. The article according to claim 13 further comprising a storage pile coupler, the pile coupler being attachable to an interior surface of the vehicle near the operator.

19. The article according to claim 18 further comprising the step of placing a storage coupling system on the material.

20. A device for shielding sunlight transmission that occurs, in a sunlight transmission area in a vehicle, the vehicle having at least one pair of visors adjacent to a main viewing window, the visors spaced sufficiently apart from each other and from the vehicle's rear view mirror thereby defining the sunlight transmission area, the device comprising a sunlight deflection apparatus formed of substantially the same material, the apparatus being of sufficient width, height and shape to completely cover the sunlight transmission area, the device adapted to be removably securable to the rear view mirror from above the rear view mirror by a coupling system.

* * * * *